United States Patent
Rowells

(10) Patent No.: US 6,968,832 B1
(45) Date of Patent: Nov. 29, 2005

(54) CONNECTION SYSTEM FOR EXHAUST GAS RECIRCULATION (EGR)

(75) Inventor: Robert Rowells, Elmwood Park, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/840,487

(22) Filed: May 6, 2004

(51) Int. Cl.[7] .............................................. F02M 25/07
(52) U.S. Cl. .................. 123/568.11; 285/261
(58) Field of Search ...................... 123/685.11, 568.17; 285/95, 98, 99, 121.7, 144.1, 148.1, 148.28, 285/148.4, 223, 261–272.4, 275, 330–332

(56) References Cited

U.S. PATENT DOCUMENTS

| | | | | |
|---|---|---|---|---|
| 5,425,347 A | * | 6/1995 | Zinke, II | ............... 123/568.11 |
| 5,492,104 A | * | 2/1996 | Elder et al. | ............ 123/568.17 |
| 5,779,282 A | * | 7/1998 | Ezze | ........................ 285/261 |
| 6,880,863 B2 | * | 4/2005 | Vila | ........................ 285/267 |

* cited by examiner

Primary Examiner—Willis R. Wolfe, Jr.
(74) Attorney, Agent, or Firm—Susan L. Lukasik; Dennis Kelly Sullivan; Jeffrey P. Calfa

(57) ABSTRACT

A connection system for exhaust gas recirculation (EGR) in a diesel engine has an EGR conduit, an exhaust manifold, and a sealing strand. The EGR conduit forms a first surface surrounding an inlet. The exhaust manifold forms a second surface surrounding an outlet. The sealing strand is disposed in a groove formed by one of the first and second surfaces. The groove has an inside surface. The first and second surfaces are pressed together to form a first seal. One of the first and second surfaces compresses the sealing strand against the inside surface to form a second seal. One of the first and second surfaces may be a convex surface. The other surface may be a concave surface.

18 Claims, 7 Drawing Sheets

CONNECTION SYSTEM FOR EXHAUST GAS RECIRCULATION (EGR)

FIELD OF THE INVENTION

This invention generally relates to exhaust gas recirculation (EGR) systems in internal combustion engines. More particularly, this invention relates to devices that connect an EGR apparatus to the exhaust manifold of a diesel engine.

BACKGROUND OF THE INVENTION

Diesel engines convert chemical energy from a fuel into mechanical energy. The fuel usually is petroleum-based. Most diesel engines compress air in a cylinder and then inject fuel into the cylinder for the compressed air to ignite. The ignited fuel generates rapidly expanding gases that actuate a piston in the cylinder. The piston usually is connected to a crankshaft or similar device for converting the reciprocating motion of the piston into rotational motion. The rotational motion from the crankshaft may be used to propel a vehicle, operate a pump or an electrical generator, or perform other work. The vehicle may be a truck, an automobile, a boat, or the like.

Many diesel engines have an exhaust gas recirculation (EGR) system to reduce the production of nitrogen oxides ($NO_x$) during the combustion process in the cylinders. The EGR system typically diverts a portion of the exhaust gases for mixing with air entering the engine for combustion. The exhaust gases generally lower the combustion temperature below the temperature where nitrogen combines with oxygen to form nitrogen oxides ($NO_x$).

To divert the exhaust gases, most EGR systems connect to the exhaust manifold of the engine. The exhaust manifold generally is an accumulation chamber above the cylinders that gathers the exhaust gases for expulsion from the vehicle. Many EGR systems have a pipe or other conduit that connects to the exhaust manifold. The pipe may divert the exhaust gases through a gas cooling device such as a heat exchanger prior to mixing the exhaust gases with the incoming air to the cylinders. The exhaust gases may have a temperature in the range of about 300° F. (149° C.) through about 1,500° F. (815° C.) during engine operation.

In many EGR systems, the pipe or other conduit is connected to the exhaust manifold by bolting a flat connection surface on the pipe against a flat connection surface on the exhaust manifold. A gasket usually is placed between the connection surfaces. The flat connection may increase the assembly time and costs due to the dimensional variations of the pipe and other components in the EGR system. The flat connection may distort and leak from the higher temperatures, thermal cycling, and thermal expansion at the connection with the exhaust manifold.

Some EGR systems use a pipe with a flexible element to reduce the assembly variation and thermal expansion from the connection with the exhaust manifold. The flexible element may increase the costs of the EGR system and may leak and fail from the higher temperatures and thermal cycling of the connection with the exhaust manifold.

SUMMARY

This invention provides a connection system for exhaust gas recirculation (EGR) in a diesel engine. The connection system presses surfaces on an EGR conduit and an exhaust manifold together. The connection system compresses a sealing strand between one of the surfaces and an inside surface of a groove formed in one of the surfaces.

A connection system for exhaust gas recirculation (EGR) may have an EGR conduit, an exhaust manifold, and a sealing strand. The EGR conduit forms a first surface surrounding an inlet. The exhaust manifold forms a second surface surrounding an outlet. The sealing strand is disposed in a groove formed in one of the first and second surfaces. The groove has an inside surface. One of the first and second surfaces is a convex surface. The other one of the first and second surfaces is a concave surface. The first and second surfaces form a first seal. The stealing strand forms a second seal between the inside surface and one of the first and second surfaces.

Another connection system for exhaust gas recirculation (EGR) may have an EGR conduit, an exhaust manifold, and a sealing strand. The EGR conduit forms a convex surface surrounding an inlet. The exhaust manifold forms a concave surface surrounding an outlet. The sealing strand is disposed in a groove formed in one of the convex and concave surfaces. The groove has an inside surface. The convex surface presses against the concave surface. One of the convex and concave surfaces compresses the sealing strand against the inside surface.

A further connection system for exhaust gas recirculation (EGR) may have an EGR conduit, an exhaust manifold, and a sealing strand. The EGR conduit forms a concave surface surrounding an inlet. The exhaust manifold forms a convex surface surrounding an outlet. The sealing strand is disposed in a groove formed in one of the convex and concave surfaces. The groove has an inside surface. The concave surface presses against the convex surface. One of the convex and concave surfaces compresses the sealing strand against the inside surface.

In a method for connecting an exhaust gas recirculation (EGR) conduit to an exhaust manifold, a concave surface engages a convex surface. The convex surface and the concave surface are clamped together. A sealing strand is compressed between an inside surface of a groove formed in one of the convex and concave surface surfaces and one of the convex and concave surfaces.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
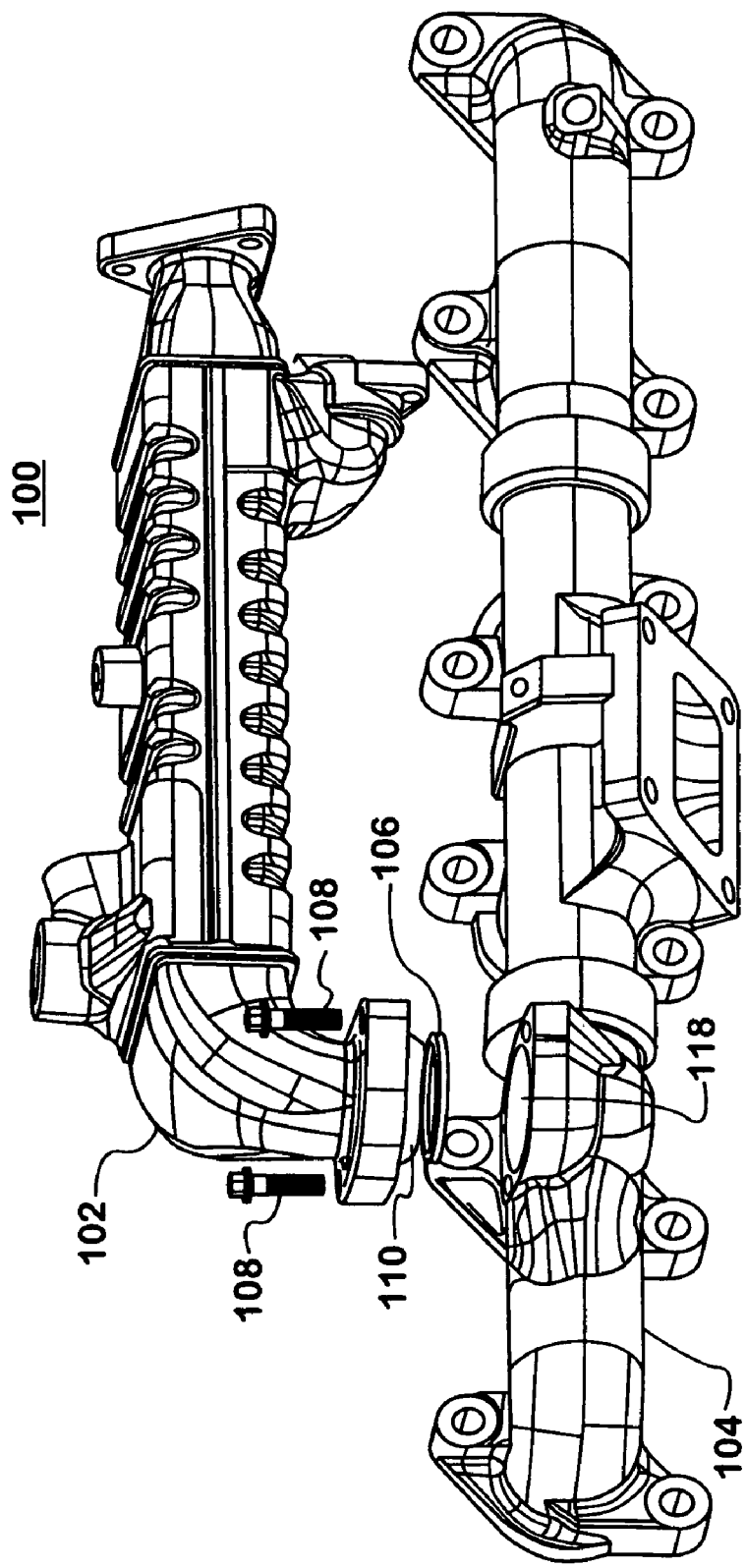
FIG. 1 is an expanded, perspective view of a connection system for exhaust gas recirculation (EGR).
Figure 2:
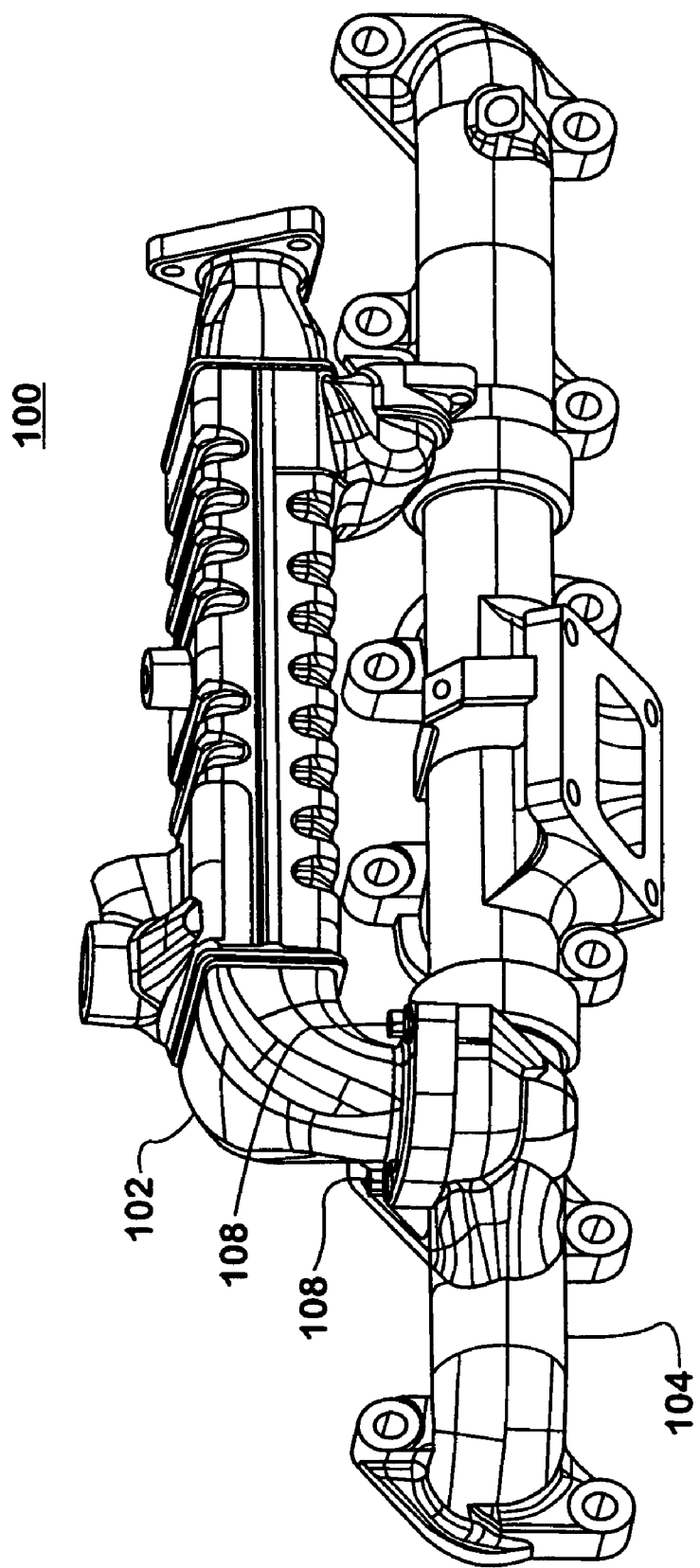
FIG. 2 is an assembled, perspective view of the connection system of FIG. 1.
Figure 3:
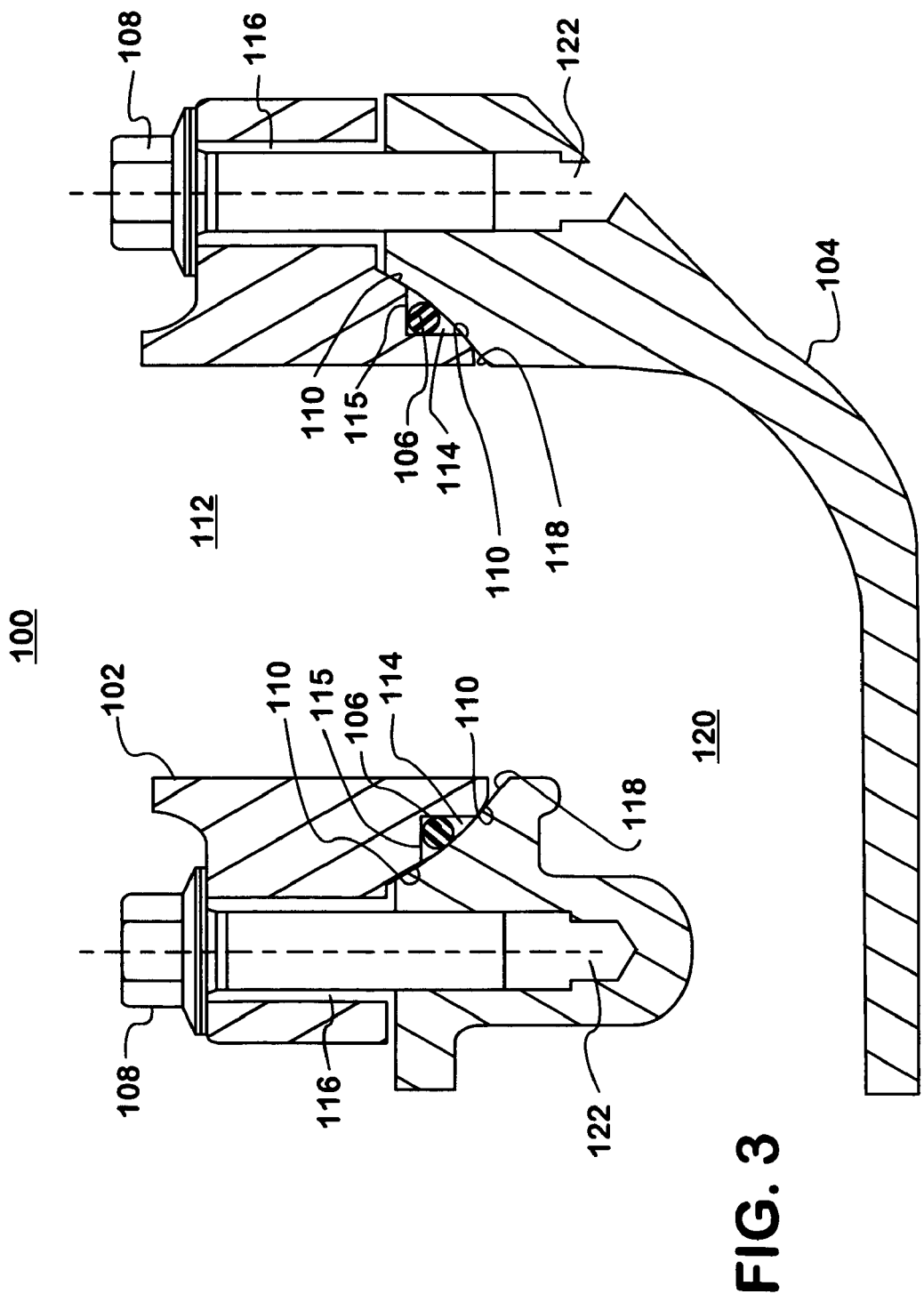
FIG. 3 is a close-up, cross-section view of the connection system of FIG. 1.

FIGS. 1–3 are various views of a connection system 100 for exhaust gas recirculation (EGR) in a diesel engine. The connection system 100 includes an exhaust gas recirculation (EGR) conduit 102, an exhaust manifold 104 for the diesel engine, a sealing strand 106, and bolts 108. The EGR conduit 102 forms a convex surface 110 surrounding an inlet 112 into the EGR conduit 102. The EGR conduit 102 forms a groove 114 along the circumference of the convex surface 110. The groove 114 has an inside surface 115. The EGR conduit 102 forms mounting bores 116 adjacent to the inlet 112. The exhaust manifold 104 forms a concave surface 118 surrounding an outlet 120 out of the exhaust manifold 104. The exhaust manifold 104 forms mounting cavities 122 adjacent to the outlet 120. During assembly, the sealing strand 106 is disposed in the groove 114. The EGR conduit 102 is connected to the exhaust manifold 104. The convex surface 110 engages the concave surface 118. The bolts 108 are inserted through the mounting bores 116 and fastened into the mounting cavities 122. The bolts 108 clamp the convex surface 110 against the concave surface 118 to form a first seal. The concave surface 118 compresses the sealing strand 106 against the inside surface 115 of the groove 114 to form a second seal. While a particular configuration is shown, the connection system 100 may have other configurations including those with additional components.

The EGR conduit 102 may be a tube or pipe for diverting exhaust gases to an EGR system in a vehicle. The EGR conduit 102 may be an EGR cooler device such as a coolant-exhaust gas heater exchanger that uses the engine coolant to reduce the temperature of the exhaust gases. The EGR conduit 102 may have other configurations. The EGR conduit 102 may be made from cast iron or steel. Other materials may be used.

The sealing strand 106 may have a rectangular, triangular, circular, or like cross-section. The sealing strand 106 may have a thickness greater than the depth of the groove 114. The sealing strand 106 may have a smaller cross-section area than the cross-sectional area of the groove 114. The sealing strand 106 may have a variable cross-section. The sealing strand 106 may be formed in a ring-like shape. The sealing strand 106 may have two or more pieces. The sealing strand 106 may be a wire or similar material that can be bent or wrapped around the groove 114. The sealing strand 106 may have other configurations. The sealing strand 106 may be made from a malleable material such as steel or copper. Other materials may be used. When assembled, the sealing strand 106 is compressed against the inside wall 115 of the groove 114 to form a seal between the EGR conduit 102 and the exhaust manifold 104. The sealing strand 106 may conform to any irregularities on the convex surface 110 or the inside surface 115. The sealing strand 106 may trap carbon particles from the exhaust gases to seal any leaks that may develop.

The groove 114 may be positioned at about the midpoint of the surface. The groove 114 may be positioned between the midpoint and either edge of the convex surface 110 or the concave surface 118. The position of the groove 114 may vary between the edges of either surface. The groove 114 may have an essentially circular circumference. The groove 114 may have an elliptical or oval circumference. The inside surface 115 of the groove 114 may have an angular, circular, or like configuration.

The bolts 108 may be essentially equidistant from each other. There may be two, three, or other multiples of bolts 108. Other mechanical connection devices may be used to hold the EGR conduit 102 and the exhaust manifold 104 together.

The convex surface 110 and the concave surface 118 may have essentially matching profiles. The convex surface 110 and concave surface 118 may have a spherical, parabolic, or like profile. The convex surface 110 and the concave surface 118 may have profiles that connect the surfaces together along essentially the entire circumference of each surface when the connection system 100 is assembled. The concave surface 118 may have a socket-like profile to receive the convex surface 110. During assembly, the convex surface 110 may be shifted, rotated, or otherwise repositioned in the concave surface 118 to accommodate or reduce the effect of dimension variations when the EGR conduit is connected to other components in the EGR system or the diesel engine. When assembled, the convex surface 110 presses against and forms a seal with the concave surface 118.

Figure 4:
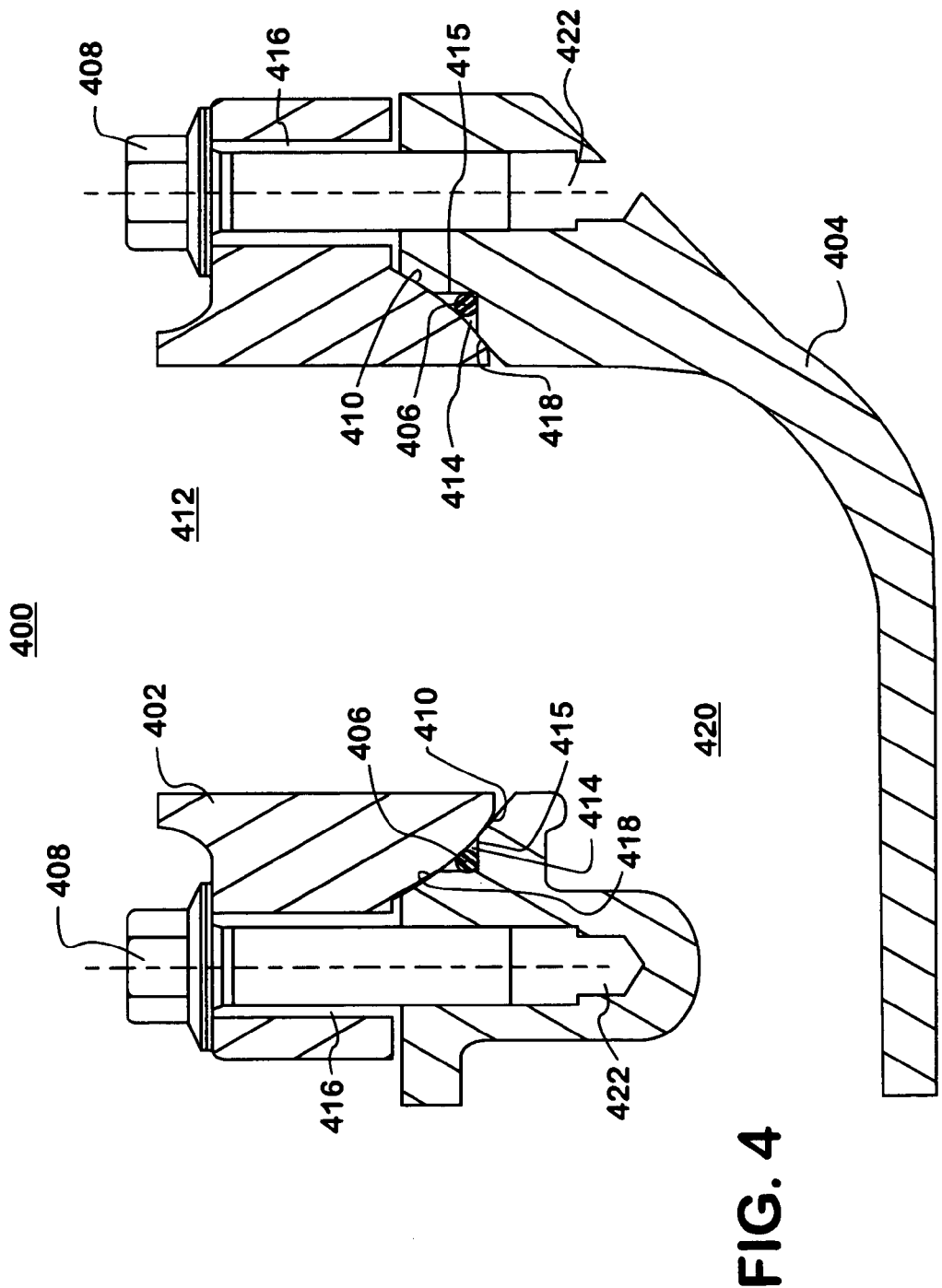
FIG. 4 is a close-up, cross-section view of another connection system for exhaust gas recirculation (EGR).
Figure 5:
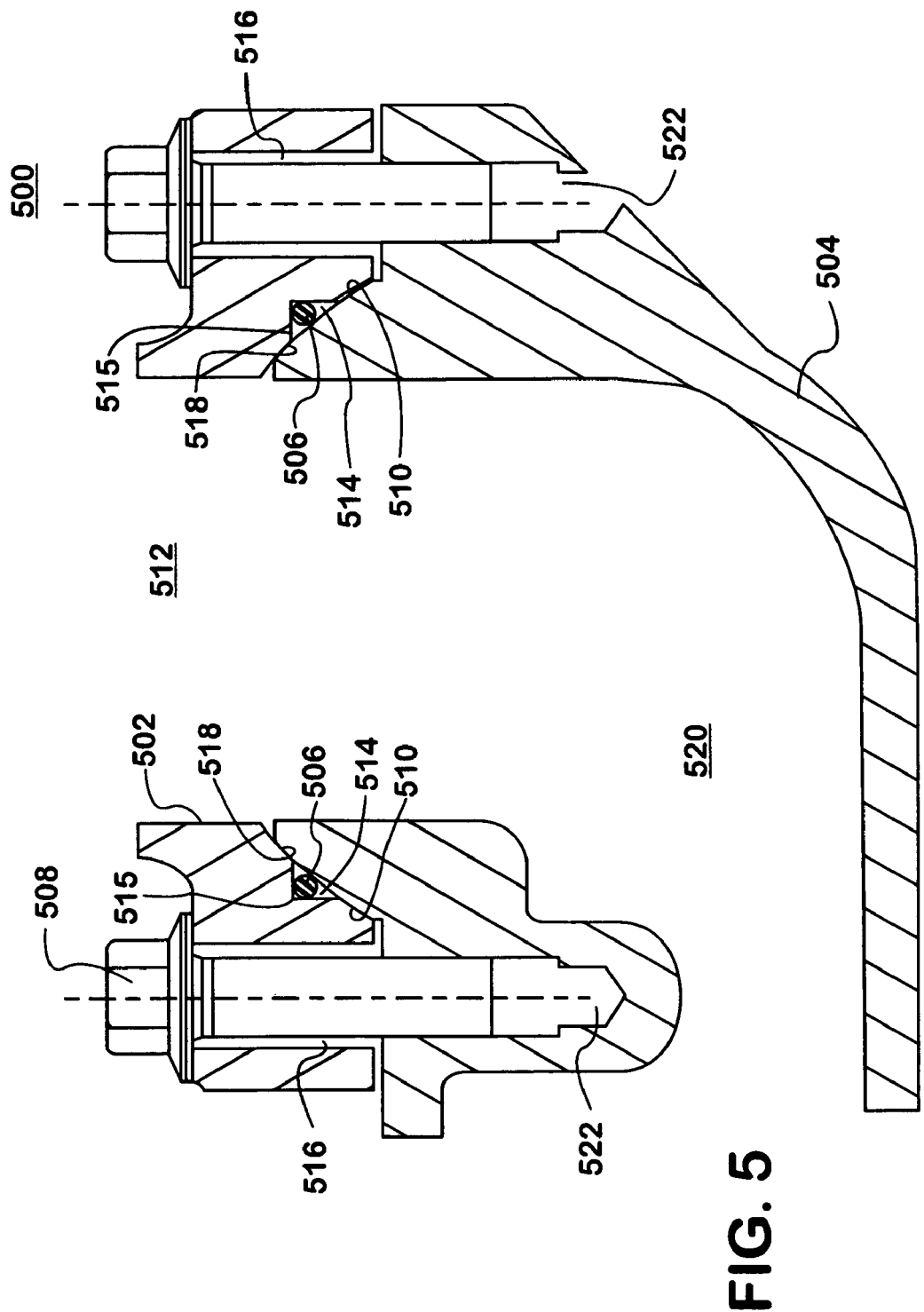
FIG. 5 is a close-up, cross-section view of an additional connection system for exhaust gas recirculation (EGR).
Figure 6:
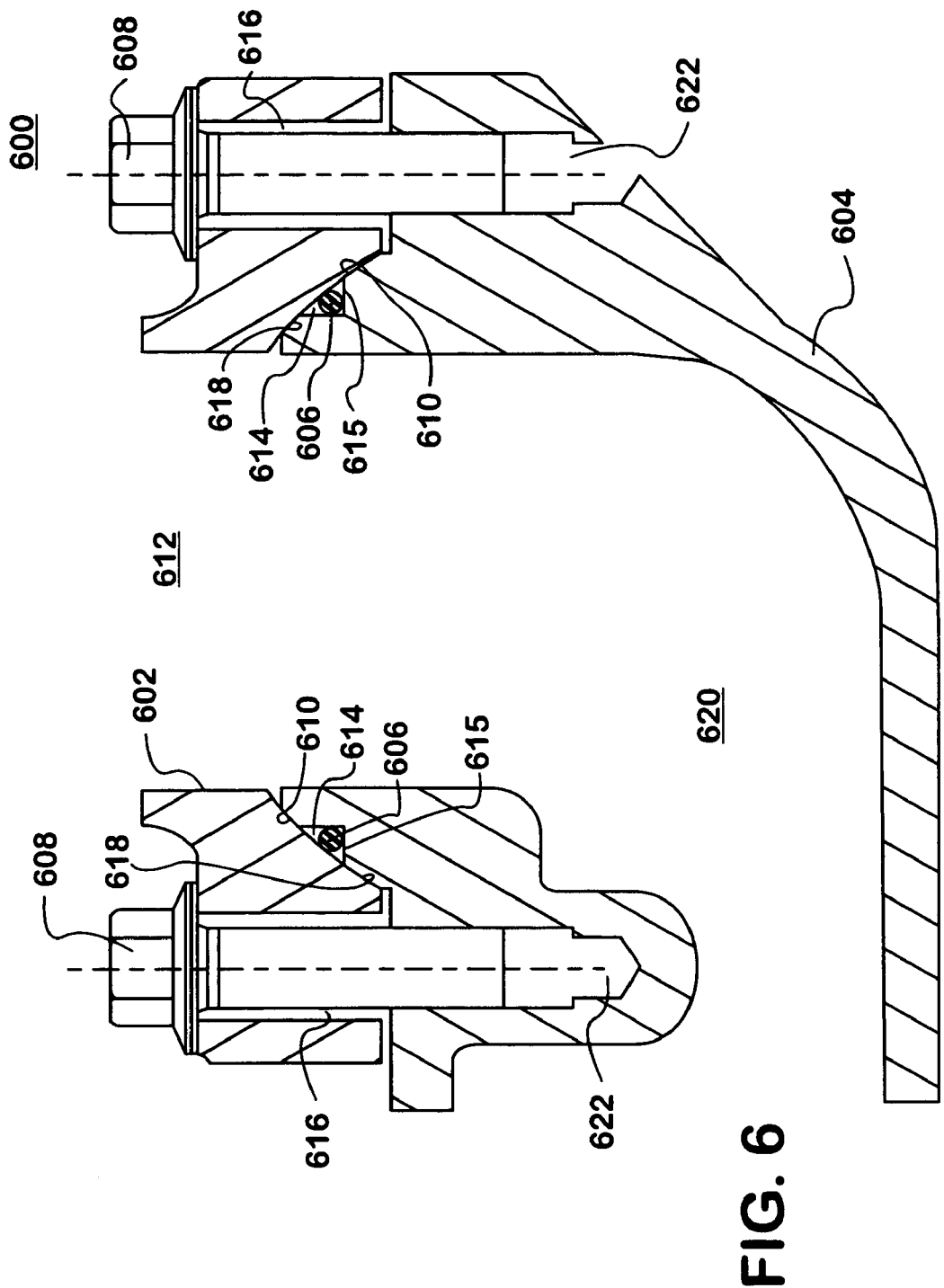
FIG. 6 is a close-up, cross-section view of a further connection system for exhaust gas recirculation (EGR).

FIGS. 4–6 are views of other connections systems for exhaust gas recirculation (EGR). The EGR conduit, exhaust manifold, sealing strand, groove, bolts, convex surface, and concave surface in these connection systems are essentially the same as the components described in relation to FIGS. 1–3 with exceptions as noted.

FIG. 4 is a view of another connection system 400 for exhaust gas recirculation (EGR). The connection system 400 includes an exhaust gas recirculation (EGR) conduit 402, an exhaust manifold 404 for the diesel engine, a sealing strand 406, and bolts 408. The EGR conduit 402 forms a convex surface 410 surrounding an inlet 412 into the EGR conduit 402. The EGR conduit 402 forms mounting bores 416 adjacent to the inlet 412. The exhaust manifold 404 forms a concave surface 418 surrounding an outlet 420 out of the exhaust manifold 404. The exhaust manifold 404 forms a groove 414 along the circumference of the concave surface 418. The groove 414 has an inside surface 415. The exhaust manifold 404 forms mounting cavities 422 adjacent to the outlet 420. During assembly, the sealing strand 406 is disposed in the groove 414. The EGR conduit 402 is connected to the exhaust manifold 404. The convex surface 410 engages the concave surface 418. The bolts 408 are inserted through the mounting bores 416 and screwed into the mounting cavities 422. The bolts 408 clamp the convex surface 410 against the concave surface 418 to form a first seal. The convex surface 410 compresses the sealing strand 406 against the inside surface 415 of the groove 414 to form a second seal. While a particular configuration is shown, the connection system 400 may have other configurations including those with additional components.

FIG. 5 is a close-up, cross-section view of an additional connection system 500 for exhaust gas recirculation (EGR). The connection system 500 includes an exhaust gas recirculation (EGR) conduit 502, an exhaust manifold 504 for the diesel engine, a sealing strand 506, and bolts 508. The EGR conduit 502 forms a concave surface 518 surrounding an inlet 512 into the EGR conduit 502. The EGR conduit 502 forms a groove 514 along the circumference of the concave surface 518. The groove 514 has an inside surface 515. The EGR conduit 502 forms mounting bores 516 adjacent to the inlet 512. The exhaust manifold 504 forms a convex surface 510 surrounding an outlet 520 out of the exhaust manifold 504. The exhaust manifold 504 forms mounting cavities 522 adjacent to the outlet 520. During assembly, the sealing strand 506 is disposed in the groove 514. The EGR conduit 502 is connected to the exhaust manifold 504. The concave surface 518 engages the convex surface 510. The bolts 508 are inserted through the mounting bores 516 and screwed into the mounting cavities 522. The bolts 508 clamp the concave surface 518 against the convex surface 510 to form a first seal. The convex surface 510 compresses the sealing strand 506 against the inside surface 515 of the groove 514 to form a second seal. While a particular configuration is shown, the connection system 500 may have other configurations including those with additional components.

FIG. 6 is a close-up, cross-section view of a further connection system for exhaust gas recirculation (EGR). The connection system 600 includes an exhaust gas recirculation (EGR) conduit 602, an exhaust manifold 604 for the diesel engine, a sealing strand 606, and bolts 608. The EGR conduit 602 forms a concave surface 618 surrounding an inlet 612 into the EGR conduit 602. The EGR conduit 602 forms mounting bores 616 adjacent to the inlet 612. The exhaust manifold 604 forms a convex surface 610 surrounding an outlet 620 out of the exhaust manifold 604. The exhaust manifold 604 forms a groove 614 along the circumference of the convex surface 610. The groove 614 has an inside surface 615. The exhaust manifold 604 forms mounting cavities 622 adjacent to the outlet 620. During assembly, the sealing strand 606 is disposed in the groove 614. The EGR conduit 602 is connected to the exhaust manifold 604. The concave surface 618 engages the convex surface 610. The bolts 608 are inserted through the mounting bores 616 and screwed into the mounting cavities 622. The bolts 608 clamp the concave surface 618 against the convex surface 610 to form a first seal. The concave surface 618 compresses the sealing strand 606 against the inside surface 615 of the groove 614 to form a second seal. While a particular configuration is shown, the connection system 600 may have other configurations including those with additional components.

Figure 7:
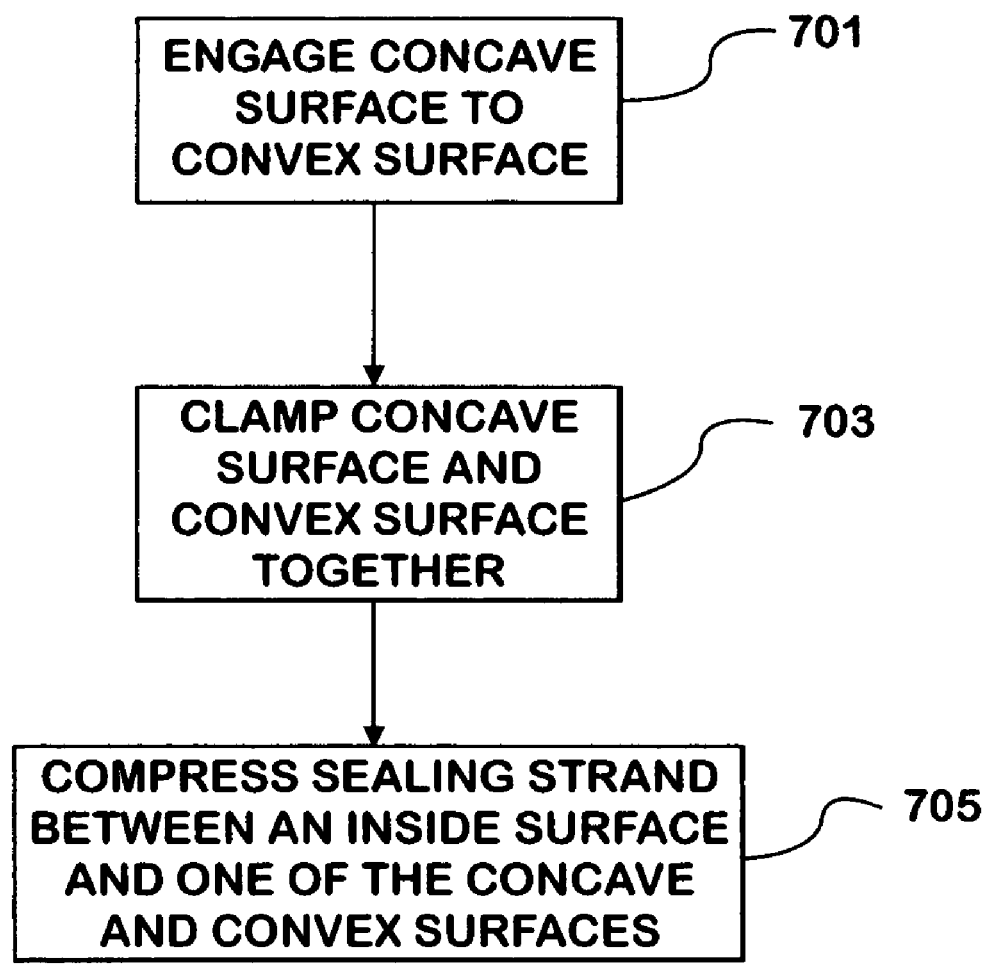
FIG. 7 is a flowchart of a method for connecting an exhaust gas recirculation (EGR) conduit to an exhaust manifold.

FIG. 7 is a flowchart of a method for connecting an exhaust gas recirculation (EGR) conduit to an exhaust manifold. In block 701, a concave surface on one of the EGR conduit and the exhaust manifold engages a convex surface on the other one of the EGR conduit and exhaust manifold as previously discussed. The concave and convex surfaces have essentially the same profiles. The convex surface 110 may be repositioned—shifted or rotated—in the concave surface 118 to accommodate or reduce the effect of dimension variations when the EGR conduit is connected to other components in the EGR system or the diesel engine. In block 703, the concave and convex surfaces are clamped together. Bolts may clamp the EGR conduit to the exhaust manifold as previously discussed. The pressure from the bolts may press the concave surface against the convex surface. The pressure from the bolts may press the convex surface against the concave surface. The concave and convex surfaces may form a first seal. In block 705, the sealing strand is compressed between an inside surface of a groove formed in one of the concave and convex surfaces and one of the concave and convex surfaces.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A connection system for exhaust gas recirculation (EGR) in a diesel engine, comprising:
    an EGR conduit forming a first surface surrounding an inlet;
    an exhaust manifold forming a second surface surrounding an outlet; and
    a sealing strand disposed in a groove formed in one of the first and second surfaces, where the groove has an inside surface;
    where one of the first and second surfaces is a convex surface, where the other one of the first and second surfaces is a concave surface, where the first and second surfaces form a first seal, and where the sealing strand forms a second seal between the inside surface and one of the first and second surfaces.

2. The connection system of claim 1, where the sealing strand has a thickness greater than a depth of the groove.

3. The connection system of claim 1,
    where the convex surface presses against the concave surface; and
    where the sealing strand is compressed between the inside surface and one of the convex and concave surfaces.

4. The connection system of claim 1, where the convex and concave surfaces have essentially matching profiles.

5. The connection system of claim 4, where the convex and concave surface have a spherical profile.

6. A connection system for exhaust gas recirculation (EGR) in a diesel engine, comprising:
    an EGR conduit forming a convex surface surrounding an inlet;
    an exhaust manifold forming a concave surface surrounding an outlet; and
    a sealing strand disposed in a groove formed in one of the convex and concave surfaces, where the groove has an inside surface;
    where the convex surface presses against the concave surface, and where one of the convex and concave surfaces compresses the sealing strand against the inside surface.

7. The connection system of claim 6, further comprising:
    at least two bolts,
    where the EGR conduit forms at least two mounting bores adjacent to the inlet, where the exhaust manifold forms at least two mounting cavities adjacent to the outlet, where the at least two bolts are disposed in the at least two mounting bores and in the at least two mounting cavities, and where the two bolts clamp the convex surface against the concave surface.

8. The connection system of claim 6, where the convex and concave surfaces have essentially matching profiles.

9. The connection system of claim 8, where the convex and concave surfaces have a spherical profile.

10. The connection system of claim 6, where the sealing strand has a thickness greater than a depth of the groove.

11. The connection system of claim 10, where the convex and concave surfaces have essentially matching profiles.

12. A connection system for exhaust gas recirculation (EGR) in a diesel engine, comprising:
- an EGR conduit forming a concave surface surrounding an inlet;
- an exhaust manifold forming a convex surface surrounding an outlet; and
- a sealing strand disposed in a groove formed in one of the convex and concave surfaces, where the groove has an inside surface;
- where the concave surface presses against the convex surface, and where one of the convex and concave surfaces compresses the sealing strand against the inside surface.

13. The connection system of claim 12, further comprising:
- at least two bolts, where the EGR conduit forms at least two mounting bores adjacent to the inlet, where the exhaust manifold forms at least two mounting cavities adjacent to the outlet, where the at least two bolts are disposed in the at least two mounting bores and in the at least two mounting cavities, and where the two bolts clamp the concave surface against the convex surface.

14. The connection system of claim 12, where the convex and concave surface have a spherical profile.

15. The connection system of claim 12, where the sealing strand has a thickness greater than a depth of the groove.

16. A method for connecting an exhaust gas recirculation (EGR) conduit to an exhaust manifold, comprising the steps of:
- engaging a concave surface of the exhaust manifold to a convex surface of the EGR conduit,
- clamping the convex surface of the exhaust manifold and the concave surface of the EGR conduit together, and
- compressing a sealing strand between an inside surface of a groove formed in one of the convex and concave surfaces and one of the convex and concave surfaces.

17. The method for connecting an EGR conduit to an exhaust manifold of claim 16, further comprising the step of repositioning the convex surface in the concave surface prior to clamping.

18. The method of connecting an EGR conduit to an exhaust manifold of claim 16, further comprising the steps of:
- creating a first seal between the convex and concave surfaces; and
- making a second seal with the sealing strand between the inside surface and one of the convex and concave surfaces.

* * * * *